United States Patent
Tanaka et al.

(10) Patent No.: US 10,780,900 B2
(45) Date of Patent: Sep. 22, 2020

(54) COMPRESSOR MODULE, AIR CONDITIONING DEVICE FOR VEHICLE AND COMPRESSOR MODULE MANUFACTURING METHOD

(71) Applicant: MITSUBISHI ELECTRIC CORPORATION, Chiyoda-ku, Tokyo (JP)

(72) Inventors: Tetsuya Tanaka, Tokyo (JP); Kenichi Hashizume, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 104 days.

(21) Appl. No.: 15/775,310

(22) PCT Filed: May 26, 2016

(86) PCT No.: PCT/JP2016/065622
§ 371 (c)(1),
(2) Date: May 10, 2018

(87) PCT Pub. No.: WO2017/090263
PCT Pub. Date: Jun. 1, 2017

(65) Prior Publication Data
US 2018/0339716 A1     Nov. 29, 2018

(30) Foreign Application Priority Data

Nov. 25, 2015   (JP) .................................. 2015-229699

(51) Int. Cl.
*B61D 27/00*     (2006.01)
*B60H 1/32*      (2006.01)
(Continued)

(52) U.S. Cl.
CPC ..... *B61D 27/0018* (2013.01); *B60H 1/00521* (2013.01); *B60H 1/00542* (2013.01);
(Continued)

(58) Field of Classification Search
None
See application file for complete search history.

(56) References Cited

U.S. PATENT DOCUMENTS 4,033,140 A  *  7/1977  Klee ....................... F25D 3/105
                                                      62/223
5,839,295 A     11/1998  Lehmann
(Continued)

FOREIGN PATENT DOCUMENTS

EP       0014085 A1    8/1980
JP       S59-149513 U  10/1984
(Continued)

OTHER PUBLICATIONS

Extended European Search Report dated Oct. 29, 2018, issued by the European Patent Office in corresponding European Application No. 16868214.4. (8 pages).

(Continued)

*Primary Examiner* — Henry T Crenshaw
(74) *Attorney, Agent, or Firm* — Buchanan Ingersoll & Rooney PC

(57)            ABSTRACT

A compressor module, as a component of a refrigerant cycle device, is attached to a casing that houses a refrigeration cycle device. The compressor module includes a compressor that compresses refrigerant, a supporting member that supports the compressor, a vibration-reducing rubber body that is attached to the supporting member, ancillary equipment that is added to the compressor, a base supporting the supporting member via the vibration-reducing rubber body and supporting the ancillary equipment with a portion of the
(Continued)

base other than the portion supporting the supporting member.

7 Claims, 6 Drawing Sheets

(51) Int. Cl.
*F04B 39/00* (2006.01)
*B60H 1/00* (2006.01)

(52) U.S. Cl.
CPC ............ *B60H 1/32* (2013.01); *B60H 1/3223* (2013.01); *B60H 1/3229* (2013.01); *B61D 27/00* (2013.01); *F04B 39/0044* (2013.01); *B60H 1/00535* (2013.01); *B60H 2001/00078* (2013.01); *B61D 27/0072* (2013.01)

(56) References Cited

U.S. PATENT DOCUMENTS

| | | | | |
|---|---|---|---|---|
| 6,260,373 | B1* | 7/2001 | Rockwood | F16F 7/1028 165/69 |
| 2004/0112325 | A1* | 6/2004 | Criddle | F02B 33/40 123/198 E |
| 2005/0158185 | A1* | 7/2005 | Herrick | F04B 39/0044 417/360 |
| 2007/0148013 | A1* | 6/2007 | Hong | F04B 39/0044 417/360 |
| 2008/0314072 | A1* | 12/2008 | Plank | B60H 1/00364 62/498 |
| 2012/0031690 | A1* | 2/2012 | Kanno | B60K 6/40 180/65.1 |
| 2013/0112282 | A1 | 5/2013 | Uto et al. | |
| 2013/0180277 | A1* | 7/2013 | Uto | B60H 1/00535 62/239 |
| 2013/0199237 | A1* | 8/2013 | Kim | F25B 1/00 62/467 |
| 2014/0144169 | A1* | 5/2014 | Inaba | G06F 1/20 62/259.2 |
| 2015/0207380 | A1* | 7/2015 | Taketomi | F04B 39/0044 310/91 |

FOREIGN PATENT DOCUMENTS

| | | |
|---|---|---|
| JP | S62-038766 U | 3/1987 |
| JP | S62-186140 A | 8/1987 |
| JP | 2001-235244 A | 8/2001 |
| JP | 2009-162305 A | 7/2009 |
| WO | WO 2012/029086 A1 | 3/2012 |

OTHER PUBLICATIONS

International Search Report (PCT/ISA/210) dated Aug. 16, 2016, by the Japanese Patent Office as the International Searching Authority for International Application No. PCT/JP2016/065622.

Written Opinion (PCT/ISA/237) dated Aug. 16, 2016, by the Japanese Patent Office as the International Searching Authority for International Application No. PCT/JP2016/065622.

Office Action (Notification of Reasons for Refusal) dated Jul. 3, 2018, by the Japanese Patent Office in corresponding Japanese Patent Application No. 2017-552278 and English translation of the Office Action. (9 pages).

Office Action dated Jul. 3, 2020, by the Chinese Patent Office in corresponding Chinese Patent Application No. 201680065879.5 and English translation of the Office Action. (16 pages).

* cited by examiner

COMPRESSOR MODULE, AIR CONDITIONING DEVICE FOR VEHICLE AND COMPRESSOR MODULE MANUFACTURING METHOD

TECHNICAL FIELD

The present disclosure relates to a compressor module, a vehicular air-conditioning device, and a compressor module manufacturing method.

BACKGROUND ART

An vehicular air-conditioning device that air-conditions the inside of a vehicle includes a casing to be installed in the vehicle and a refrigeration cycle device that is housed in the casing. The refrigeration cycle device includes a compressor, a condenser, an evaporator, an expander, an accumulator, and refrigerant pipes that connect these components together.

As indicated in Patent Literature 1, a refrigeration cycle device separated into multiple modules for the purpose of improving assembly work efficiency is proposed. In other words, each of the compressor, the condenser, the evaporator, and the like is individually pre-manufactured as a module. These modules are subsequently assembled in the aforementioned casing and are made to form the refrigeration cycle device.

CITATION LIST

Patent Literature

[Patent Literature 1] International Publication No. WO 2012/029086

SUMMARY OF INVENTION

Technical Problem

The compressor among the constituent components of the refrigeration cycle device vibrates while in operation. Since addressing this vibration, even in the aforementioned modules, is necessary, the weight of that equipped with the compressor (hereinafter referred to as the compressor module) tends to be heavy.

This is described in detail. The compressor module includes a compressor, ancillary equipment such as refrigerant pipes and valves that are added thereto, and a base that supports the compressor and the ancillary equipment and is mounted into the aforementioned casing. Also, in order to suppress propagation of vibration from the compressor to the casing, a vibration-reducing rubber body is interposed between the base and the casing; hence vibration is reduced along the entire base.

However, when the base resonates with the vibration of the compressor, this can cause the ancillary equipment that is supported by the base to break. Therefore, imparting the base with a natural vibrational frequency that is greater than the vibration frequency of the compressor is a matter of importance. In order to increase the natural vibrational frequency, it is necessary to improve rigidity. Further, since there is a limit as to how light the base can be made, there is difficulty in reducing the weight of not only the compressor module but also the vehicular air-conditioning device.

An objective of the present disclosure is to provide a lightweight compressor module and manufacture method thereof, and also a vehicular air-conditioning device.

Solution to Problem

In order to achieve the aforementioned objective, a compressor module of the present disclosure for attaching to a casing that houses a refrigeration cycle device as a constituent component of the refrigeration cycle device includes:
a compressor to compress refrigerant;
a supporting member to support the compressor;
a shock-absorbing body attached to the supporting member;
ancillary equipment added to the compressor; and
a base fixed to the casing to support the supporting member via the shock-absorbing body, and to support the ancillary equipment with a portion other than a portion supporting the supporting member.

Advantageous Effects of Invention

According to the present disclosure, since the supporting member supports the compressor and the base supports the supporting member via a shock-absorbing body, forming the entirety of the base with a high rigidity is unnecessary as long as the supporting member is imparted with a rigidity that can avoid resonance otherwise caused by vibration of the compressor. As a result of this, a compressor module as well as a vehicular air-conditioning device can be made lightweight.

DESCRIPTION OF EMBODIMENTS

Hereinafter, a vehicular air-conditioning device and a compressor module according to embodiments of the present disclosure are described with reference to the drawings. The same reference signs are used for the same or equivalent parts throughout the drawings.

Embodiment 1

Figure 6:
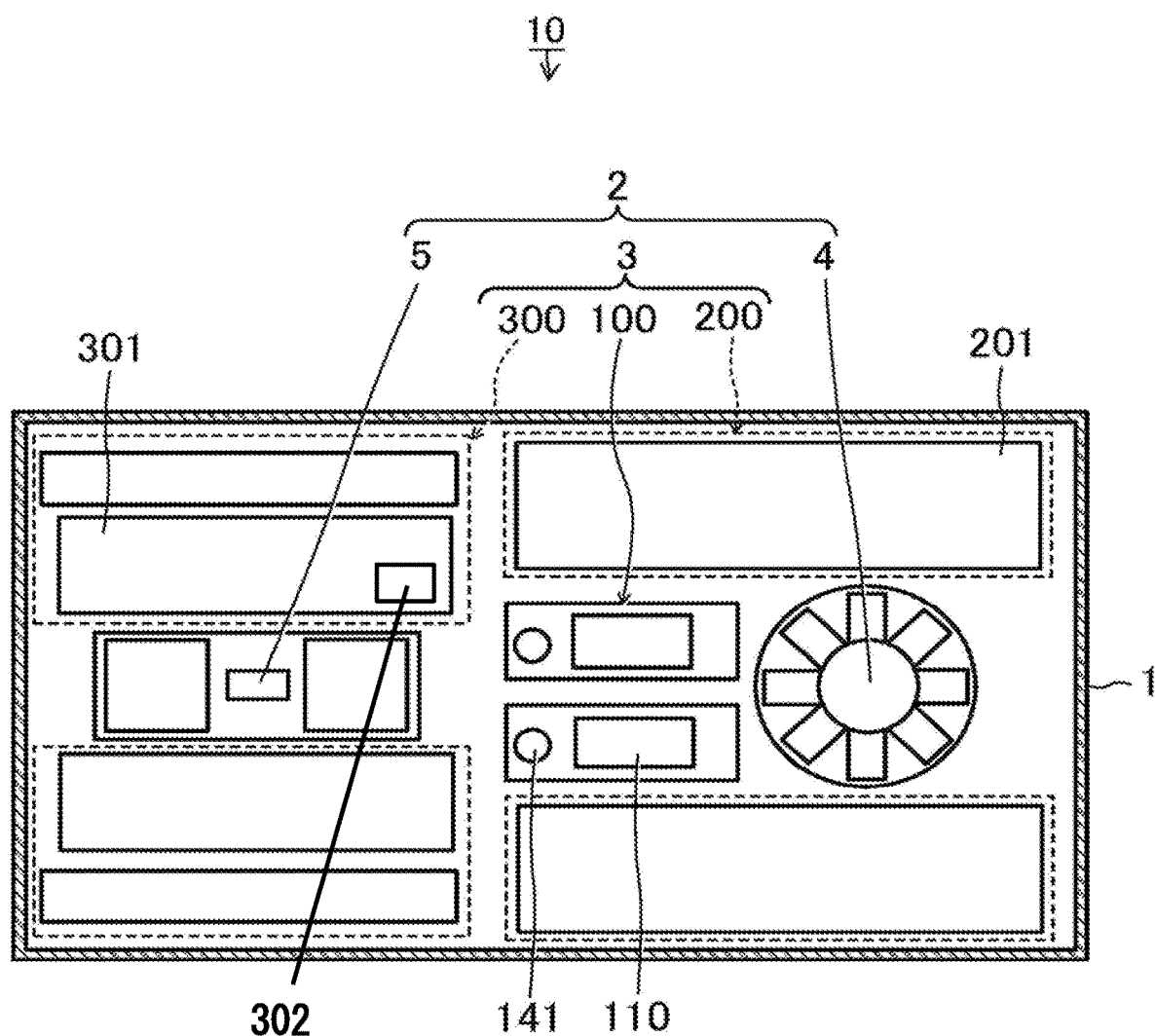
FIG. 6 is a partial cross-sectional plan view of a vehicular air-conditioning device according to Embodiment 1.

As illustrated in FIG. 6, a vehicular air-conditioning device 10 according to the present embodiment includes a casing 1 that is disposed on the roof of railway vehicle and an air-conditioning apparatus 2 that is housed in the casing 1 and air-conditions a passenger cabin of the railway vehicle. The casing 1 includes a box-shaped base frame having a bottom panel, side panels, an opening on the upper portion of the casing 1 and a top panel closing the upper opening of the base frame. In FIG. 6, the top panel is omitted to reveal the internal components of the casing 1.

The air-conditioning apparatus 2 includes a module group 3 that makes up the refrigeration cycle device, an outdoor fan 4 that emits, to the outside, air heat-exchanged with one of a condenser and an evaporator of the refrigeration cycle device, and an indoor fan 5 that blows, into the passenger cabin, air heat-exchanged with the other one of the condenser and the evaporator.

The module group 3 includes (i) a compressor module 100 containing a compressor 110 that compresses refrigerant and an accumulator 141 that separates refrigerant liquid from refrigerant vapor as well as (ii) an outdoor heat-exchanger module 200 and (iii) an indoor heat-exchanger module 300 that serve as cooperating devices and together with the compressor module 100 constitute the refrigeration cycle device.

The outdoor heat-exchanger module 200 contains an outdoor heat-exchanger 201. The indoor heat-exchanger module 300 contains an indoor heat-exchanger 301 and expander 302 that causes the refrigerant to expand. One of the outdoor heat-exchanger 201 and the indoor heat-exchanger 301 is a condenser that causes refrigerant to condense, whereas the other one is an evaporator that causes the refrigerant to evaporate. The expander includes either an expansion valve or a capillary tube.

Below, operation of a vehicular air-conditioning device 10 is described in an example in which a passenger cabin of a railway vehicle is cooled by using the outdoor heat-exchanger 201 as the condenser and the indoor heat-exchanger 301 as the evaporator.

The compressor 110 compresses the refrigerant. The compressed refrigerant is sent to the outdoor heat-exchanger 201 serving as the condenser. The outdoor heat-exchanger 201 causes the refrigerant to condense by releasing heat to the surroundings. While doing so, the air heated by the outdoor heat-exchanger 201 is released to the outside by the outdoor fan 4.

The refrigerant condensed by the outdoor heat-exchanger 201 is sent via the expander to the indoor heat-exchanger 301 serving as the evaporator. The indoor heat-exchanger 301 causes the refrigerant to evaporate by absorbing heat from the surroundings. While doing so, the air cooled by the indoor heat-exchanger 301 is blown into the passenger cabin by the indoor fan 5.

The refrigerant that passed through the indoor heat-exchanger 301 is sent to the accumulator 141. The accumulator 141 separates the refrigerant vapor evaporated by the indoor heat-exchanger 301 from the refrigerant liquid that was not evaporated by the indoor heat-exchanger 301 and then sends just the refrigerant vapor to the compressor 110. The refrigerant circulates in the aforementioned order.

The compressor module 100 in particular of the vehicular air-conditioning device 10 includes a unique configuration to attain greater weight reduction. Therefore, the compressor module 100 is described in detail with reference to FIGS. 1 to 5.

Figure 1:
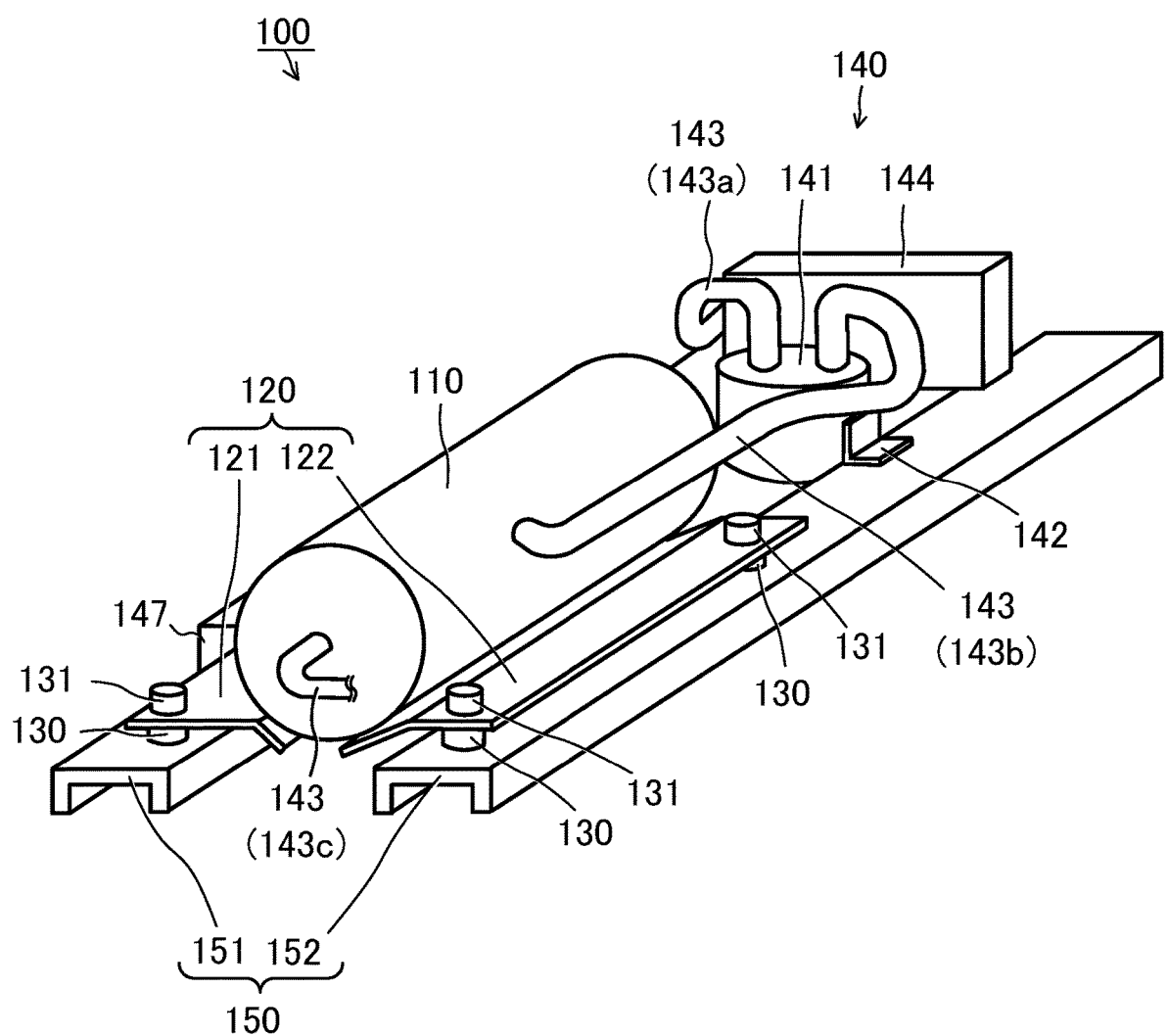
FIG. 1 is a perspective view of a compressor module according to Embodiment 1.

As illustrated in FIG. 1, the compressor module 100 includes the compressor 110 also illustrated in FIG. 6, a supporting member 120 that supports the compressor 110, a vibration-reducing rubber body 130 acting as a shock-absorbing body that is installable on the supporting member 120, ancillary equipment 140 that is added to the compressor 110, and a base 150 that supports the supporting member 120 via the vibration-reducing rubber body 130 and supports the ancillary equipment 140 with a portion other than a portion supporting the supporting member 120.

With this configuration, the base 150 indirectly supports the compressor 110 via the vibration-reducing rubber body 130 and the supporting member 120 so forming the entirety of the base 150 with a high rigidity is unnecessary as long as the supporting member 120 is imparted with a rigidity that can avoid resonance otherwise caused by vibration of the compressor 110. As a result of this, the compressor module 100 as well as the vehicular air-conditioning device 10 can be made lightweight. Each component in the configuration is described in detail below.

The base 150 is fixed to the casing 1 illustrated in FIG. 6. The base 150 includes a first rail 151 and a second rail 152 that run parallel to each other with space therebetween. The first rail 151 and the second rail 152 are elongated in a horizontal direction, specifically taking the horizontal direction to be the lengthwise direction; that is the direction parallel to a bottom panel of the casing 1 illustrated in FIG. 6.

The supporting member 120 includes a first supporting strip 121 that is supported by the first rail 151 via the vibration-reducing rubber body 130 and a second supporting strip 122 that is supported by the second rail 152 via the vibration-reducing rubber body 130. The first supporting strip 121 extends along the first rail 151; that is, the first supporting strip 121 is parallel to the first rail 151. The second supporting strip 122 extends along the second rail 152; that is, the second supporting strip 122 is parallel to the second rail 152.

However, the first supporting strip 121 and the second supporting strip 122 are shorter in length than the first rail 151 and the second rail 152, respectively. The first supporting strip 121 and the second supporting strip 122 are arranged more closely to one lengthwise-direction end (the end in the foreground of FIG. 1) of the first rail 151 and the second rail 152, respectively.

One vibration-reducing rubber body 130 together with one auxiliary vibration-reducing rubber body 131 vertically sandwich the first supporting member 121, and another vibration-reducing rubber body 130 together with another auxiliary vibration-reducing rubber body 131 likewise sandwich the second supporting strip 122. Also, in these sandwiched portions, the base 150, the vibration-reducing rubber body 130 thereon, the supporting member supporting member 120 thereon, and the auxiliary vibration-reducing rubber body 131 are linked together by a nut and bolt as linking means. A pair of the vibration-reducing rubber body 130 and the auxiliary vibration-reducing rubber body 131 vertically opposing each other is disposed on opposite-end portions of the first supporting strip 121 and opposite-end portions of the second supporting strip 122 in the extending direction.

The compressor 110 is horizontally mounted on the supporting member 120 supporting the compressor 110. Specifically, housing, serving as an outer shell of compressor 110, includes a rotating shaft and a compressing mechanism that compresses refrigerant by rotation of the rotating shaft. The compressing mechanism includes an orbiting scroll member that orbits due to rotation of the rotating shaft and a fixed scroll member that is fixed to the housing. Horizontally-arranged means that the rotating shaft passes through a virtual plane perpendicular to the rotating shaft; and more specifically refers to a form in which the compressor 110 is positioned so as to be parallel to the bottom panel of the casing 1 as illustrated in FIG. 6.

Specifically, the rotating shaft of the compressor 110 extends horizontally parallel to the extending direction of the first supporting strip 121 and the second supporting strip 122. As for external appearances, the compressor 110 is cylindrically shaped and arranged in a sideways-oriented fashion extending parallel to the first supporting strip 121 and the second supporting strip 122.

The ancillary equipment 140 includes a functional ancillary member that, together with the compressor 110, achieves the function of the refrigeration cycle device, and includes a structural ancillary member for supporting and fixing the functional ancillary member. Specifically, the ancillary equipment 140 includes (i) the accumulator 141 also illustrated in FIG. 6, (ii) fixing members 142 that fix the accumulator 141 to the base 150, (iii) a refrigerant piping group 143 that is formed from a plurality of refrigerant pipes that circulate refrigerant and are each connected to at least the compressor 110 or the accumulator 141, and (iv) a pipe supporting member 144 that supports the refrigerant pipes that form the refrigerant piping group 143. The accumulator 141 and the refrigerant piping group 143 make up the aforementioned functional ancillary member. The fixed member 142 and the pipe supporting member 144 make up the aforementioned structural ancillary member.

The refrigerant piping group 143 includes an inlet main pipe 143a that supplies refrigerant to the accumulator 141, an intermediate main pipe 143b that supplies the compressor 110 with refrigerant vapor separated by the accumulator 141, and an outlet main pipe 143c that discharges refrigerant compressed by the compressor 110 to the outdoor heat-exchanger 201 illustrated in FIG. 6. For easier understanding, a portion of the refrigerant piping group 143 is omitted in FIG. 1.

Next, the configuration of the ancillary equipment 140 is described in detail with reference to FIG. 2.

Figure 2:
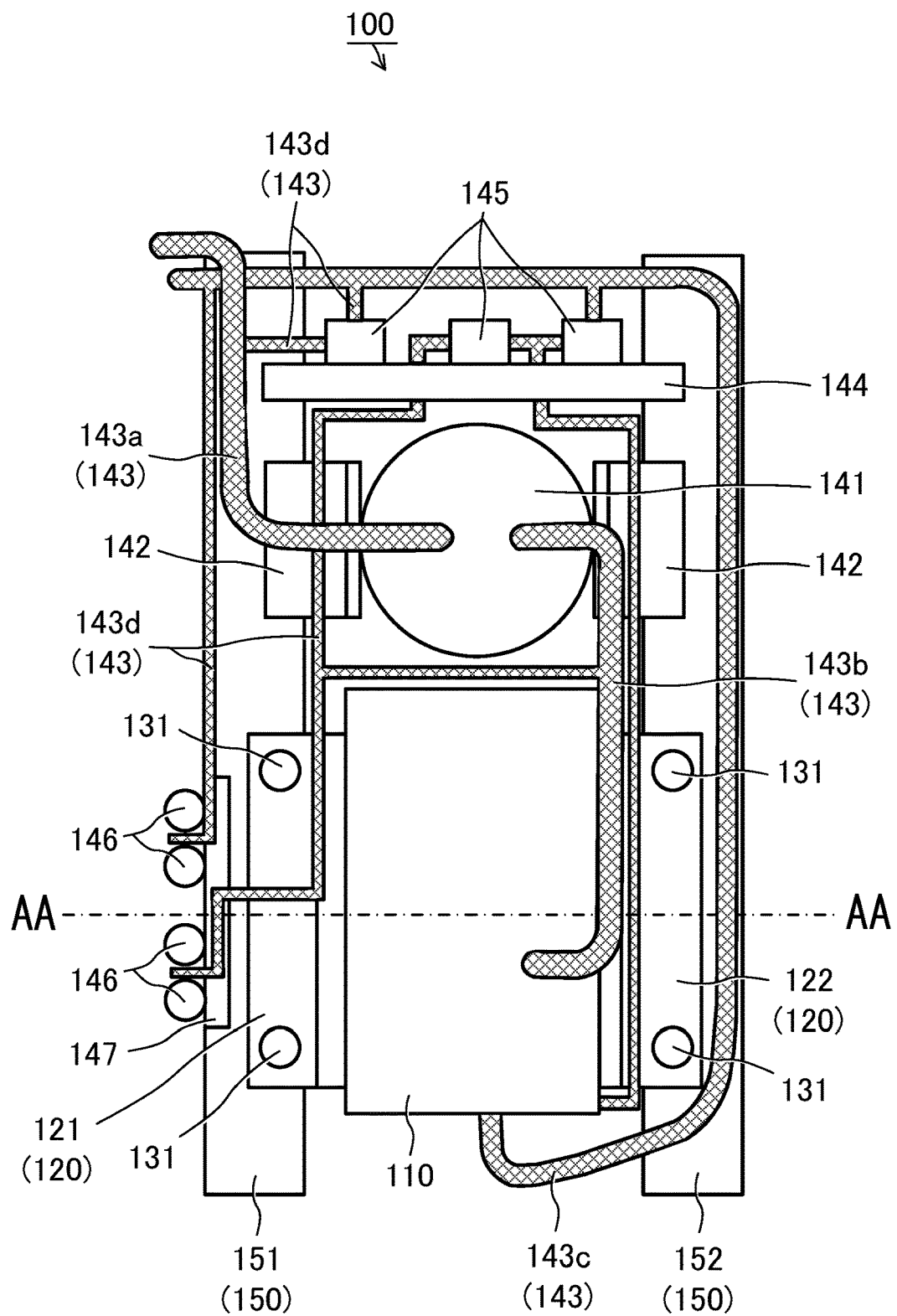
FIG. 2 is a plan view of the compressor module according to Embodiment 1.

As illustrated in FIG. 2, the aforementioned ancillary equipment 140 (see FIG. 1) is provided not only with the previously-described accumulator 141, the fixing member 142, the refrigerant piping group 143, and the pipe supporting member 144, but also valves 145 that are installed on the refrigerant pipes of the refrigerant piping group 143 and control the flow of refrigerant, sensors 146 that detect the temperature and physical amounts for pressure and the like regarding the surrounding environment and refrigerant, and a sensor supporting member 147 that supports the sensor 146. The valves 145 and the sensors 146 are the functional ancillary members described above. The sensor supporting member 147 is the structural ancillary member described above.

In addition to the previously-described inlet main pipe 143a, the intermediate main pipe 143b, and the outlet main pipe 143c, the refrigerant piping group 143 also includes a support piping group 143d that is connected to at least one of the main pipes 143a to 143c. These refrigerant pipes that make up the refrigerant piping group 143 are made of metal. To clearly indicate the configuration of the refrigerant piping group 143, the refrigerant piping group 143 is shaded in FIG. 2 (likewise in FIGS. 4 and 5 described further below).

All of the constituent components of the aforementioned ancillary equipment 140 (see FIG. 1) are supported by portions of the base 150 other than the portions supporting the supporting member 120. These components are described in detail below.

Relative to the lengthwise direction of the base 150, the pipe supporting member 144 is fixed to the base 150, the position of the pipe supporting member 144 being between the supporting member 120 and the end on the side opposite (upper side in FIG. 2) to the side where the supporting member 120 is disposed (lower side in FIG. 2). The pipe supporting member 144 extends from the first rail 151 to the second rail 152 and is supported by both of the rails 151 and 152.

The pipe supporting member 144 supports the valve 145 and the support piping group 143d in which the valve 145 is provided. That is, the base 150 supports the valve 145 and the support piping group 143d via the pipe supporting member 144.

The fixing members 142 are fixed to the first rail 151 and the second rail 152 at positions in between the supporting member 120 and the pipe supporting member 144. The fixing member 142 fixed to the first rail 151 and the fixing member 142 fixed to the second rail 152 support the accumulator 141. The refrigerant piping group 143 is connected to the accumulator 141. That is, the base 150 supports the accumulator 141 and the refrigerant piping group 143 via the fixing members 142.

The sensor supporting member 147 is supported by an end of the first rail 151 that is on a side opposite to that of the second rail 152 in the transverse direction. The sensor supporting member 147 is disposed next to the first supporting strip 121 in the aforementioned transverse direction. The sensor supporting member 147 supports the sensor 146 and the support piping group 143d. That is, the base 150 supports the sensor 146 and the support piping group 143d via the sensor supporting member 147.

Next, the structure peripheral to the supporting member 120 and the base 150 is described in detail with reference to FIG. 3.

Figure 3:
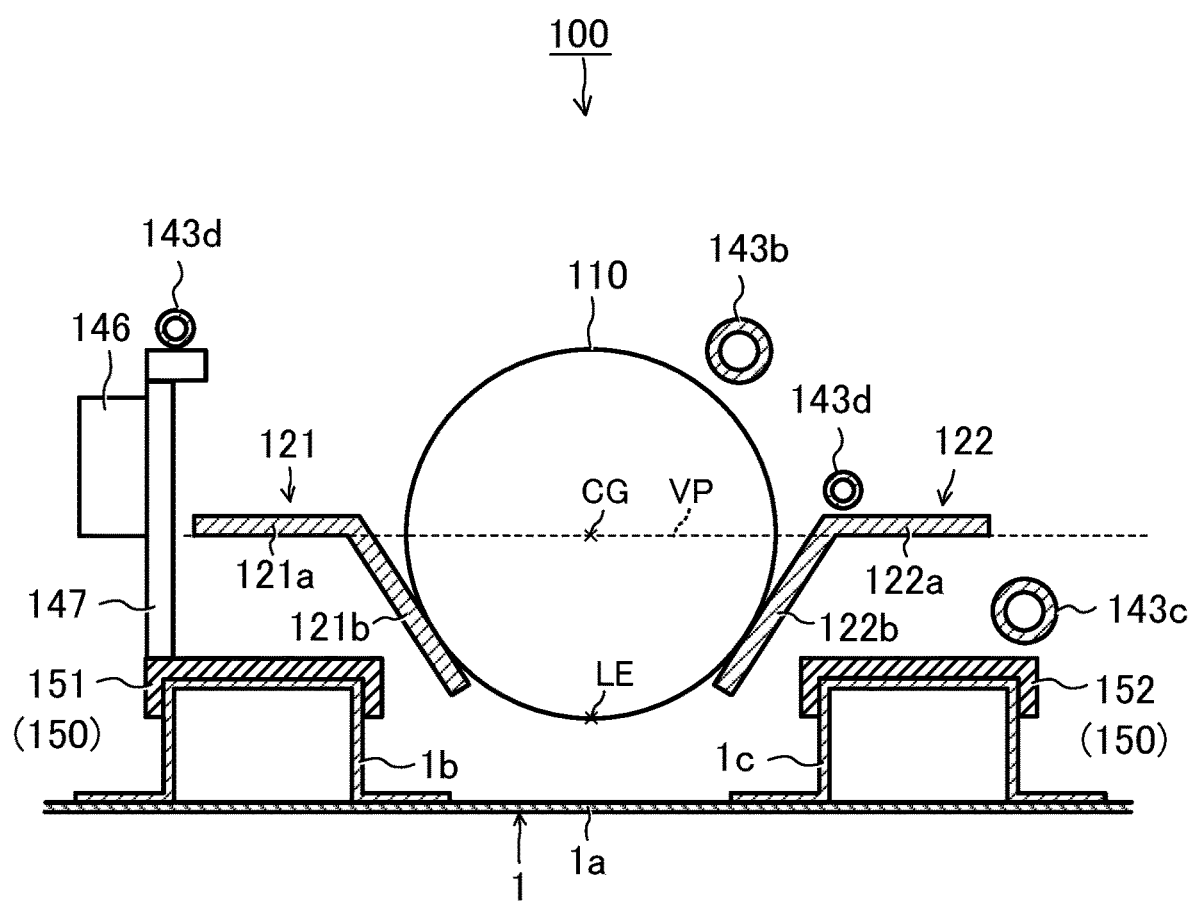
FIG. 3 is a partial cross-sectional view illustrating position of the compressor module that is taken along line AA-AA of FIG. 2.

As illustrated in FIG. 3, the first supporting strip 121 includes a horizontal member 121a that is positioned above the first rail 151 and an inclined portion 121b that inclines downward from the horizontal member 121a toward the second rail 152. The horizontal member 121a is sandwiched between the vibration-reducing rubber body 130 and the auxiliary vibration-reducing rubber body 131 (see FIG. 1). The tip of the inclined portion 121b is a free end. The inclined portion 121b is a cantilever fixed to the horizontal member 121a and can be elastically flexed.

Likewise, the second supporting strip 122 includes a horizontal member 122a that is positioned above the second rail 152 and an inclined portion 122b that inclines downward from the horizontal member 122a toward the first rail 151. The horizontal member 122a is sandwiched between the vibration-reducing rubber body 130 and the auxiliary vibration-reducing rubber body 131 (see FIG. 1). The tip of the inclined portion 122b is a free end. The inclined portion 122b is a cantilever fixed to the horizontal member 122a and can be elastically flexed.

The distance between the tip of the one inclined portion 121b and the tip of the other inclined portion 122b is smaller than the diameter of the cylindrical bottom surface of the housing of the compressor 110. Also, the compressor 110 is supported by the inclined portions 121b and 122b. The inclined portions 121b and 122b support the cylindrical side surfaces of the housing of the compressor 110. These areas of contact between these side surfaces and the inclined portions 121b and 122b extend along the generatrix of the side columnar surfaces.

Furthermore, along these areas of contact, the inclined portion 121b and the compressor 110 and the inclined portion 122b and the compressor 110 are joined together by welding. The joining means for joining the inclined portion 121b to the compressor 110 and the inclined portion 122b to the compressor 110 is not necessarily limited to welding. For example, a nut and bolt may be used instead. Also, a vibration-reducing rubber body may be interposed between the inclined portion 121b and the compressor 110 and between the inclined portion 122b and the compressor 110.

The manufacturing method of the compressor module 100 preferably includes a step of joining the first supporting strip 121 and the second supporting strip 122 to the compressor 110 in advance, and also a step of making the base 150 support the compressor 110 by placing the horizontal members 121a and 122a with the vibration-reducing rubber body 130 therebetween (see FIG. 1) onto the base 150 and attaching the ancillary equipment 140 to the portion of the base 150 other than the portion of the base 150 supporting the first supporting strip 121 and the second supporting strip 122. Doing so eliminates the need to weld the compressor 110 together with the first supporting strip 121 and the second supporting strip 122 in a small workspace, and thus improves manufacturing efficiency.

However, the first supporting strip 121 and the compressor 110 and the second supporting strip 122 and the compressor 110 do not necessarily have to be welded together. The compressor 110 may be simply mounted on the inclined portions 121b and 122b without welding the compressor 110 to the first supporting strip 121 and the second supporting strip 122.

Since the inclined portions 121b and 122b support the compressor 110, the height at which the compressor 110 is disposed can be decreased. Specifically, the lower edge LE of the compressor 110 is situated lower than an attachment surface of the vibration-reducing rubber body 130 that is attached to the supporting member 120 (see FIG. 1), the attachment surface being the virtual plane VP extending along the bottom surface of the horizontal members 121a and 122a.

Further, the center of gravity CG of the compressor 110 lies on the virtual plane VP. Here, the center of gravity CG of the compressor 110 is located on the axis of rotation inside the housing of the compressor 110. The center of gravity CG of the compressor 110 may be located at a position lower than that of the virtual plane VP.

Next, the structure for fixing the base 150 to the casing 1 (see FIG. 6) is described in detail.

As illustrated in FIG. 3, the casing 1 includes a bottom panel 1a as well as a first beam 1b and a second beam 1c that are provided on the bottom panel 1a. The first beam 1b and the second beam 1c each have a convex cross-section that protrudes upwardly from the bottom panel 1a, and a ridgeline body extending in a direction parallel to the bottom panel 1a, more specifically, extending in a horizontal direction (a direction perpendicular to the drawing paper of FIG. 3). The first beam 1b and the second beam 1c extend in parallel fashion.

Conversely, the first rail 151 and the second rail 152 each has a concave cross-section that is recessed downwards and a ridgeline body extending in the horizontal direction (the direction perpendicular to the drawing paper of FIG. 3) parallel to the first beam 1b and the second beam 1c.

Also, the concave ridgeline body of the first rail 151 is fitted onto the convex portion of the convex ridgeline body of the first beam 1b. In a likewise manner, the second rail 152 is fitted onto the second beam 1c. A nut-bolt combination is used for fixing first rail 151 to the first beam 1b and for fixing the second rail 152 to the second beam 1c while in a joined state.

In this manner, the first rail 151 and the second rail 152, as the base 150, are fixed to the casing 1. As previously described, the vibration generated by the compressor 110 is attenuated by the vibration-reducing rubber body 130 and the auxiliary vibration-reducing rubber body 131 (see FIG. 1). Therefore, unlike in conventional technology, interposing a vibration-reducing rubber body between the base 150 and the casing 1 is unnecessary. Therefore, a vibration-reducing rubber body is not interposed between the first rail 151 and the first beam 1b and between the second rail 152 and the second beam 1c.

The above-described present embodiment attains the following advantages.

(1) The base 150 indirectly supports the compressor 110 via the vibration-reducing rubber body 130 and the supporting member 120. Therefore, vibration transmitted from the compressor 110 to the base 150 is suppressed by the vibration-reducing rubber body 130 and thus any resonance otherwise caused by the vibration of the compressor 110 can be avoided because of the natural vibrational frequency of the supporting member 120. As long as the supporting member 120 is imparted with rigidity at which resonance can be avoided, imparting the entirety of the base 150 with a high rigidity is unnecessary.

Also, the ancillary equipment 140 such as the accumulator 141, the pipe supporting member 144, and the sensor supporting member 147 are supported by the portion of the base 150, to which vibration transmitted is suppressed, other than the portion that supports the supporting member 120. Therefore, a simple installation structure can be use without having to impart high rigidity to the portion of the base 150 to which the ancillary equipment 140 is attached.

As a result of the above, the amount of thick material and reinforcement members used for the entirety of the compressor module 100 to attain a high rigidity thereof can be reduced beyond that used in conventional technology. Therefore, the compressor module 100 as well as the vehicular air-conditioning device 10 can be made lighter in weight than that of conventional technology.

(2) Arranging the compressor 110 in a horizontally-oriented fashion having the inclined portions 121b and 122b that are inclined downwardly support the sideways-oriented compressor 110 lowers the height at which the compressor 110 is disposed and impart the compressor 110 with a lower center of gravity. Specifically, the lower edge LE of the compressor 110 is situated below the virtual plane VP, and the center of gravity CG of the compressor 110 is located on the virtual plane VP. This stabilizes the sitting position of the compressor 110.

This is described in detail. Conventionally, when the compressor 110 is started or is in operation, there are instances where the position of the compressor 110 would shift horizontally due to self-vibration. Also, when inertial force in association with the operation of the railway vehicle acts upon the compressor 110, there are instances where the position of the compressor 110 would shift horizontally. Lowering the height at which the compressor 110 is disposed provides a lower center of gravity, and therefore positional shifting of the compressor 110 can be suppressed. Lowering the center of gravity CG of the compressor 110 to a position below the virtual plane VP further stabilizes the sitting position of the compressor 110.

Also, the suppressing of positional shifting of the compressor 110 contributes toward lessening the stress that acts on the refrigerant piping group 143 such as the intermediate main pipe 143b and the outlet main pipe 143c that are connected to the compressor 110.

Also, lowering the height at which the compressor 110 is disposed enables the height of the compressor module 100 to be decreased, which in turn helps reduce the space the compressor module 100 occupies in the casing 1, thereby improving space efficiency.

Embodiment 2

In previously-described Embodiment 1, the refrigerant pipes that make up the refrigerant piping group 143 includes metal such as cooper and steel and is rigid. It is sufficient for at least one refrigerant pipe of the refrigerant piping group 143 to have a flexible portion that has a higher degree of flexibility than another portion on the same refrigerant pipe. Below, a specific example is described with reference to FIG. 4.

Figure 4:
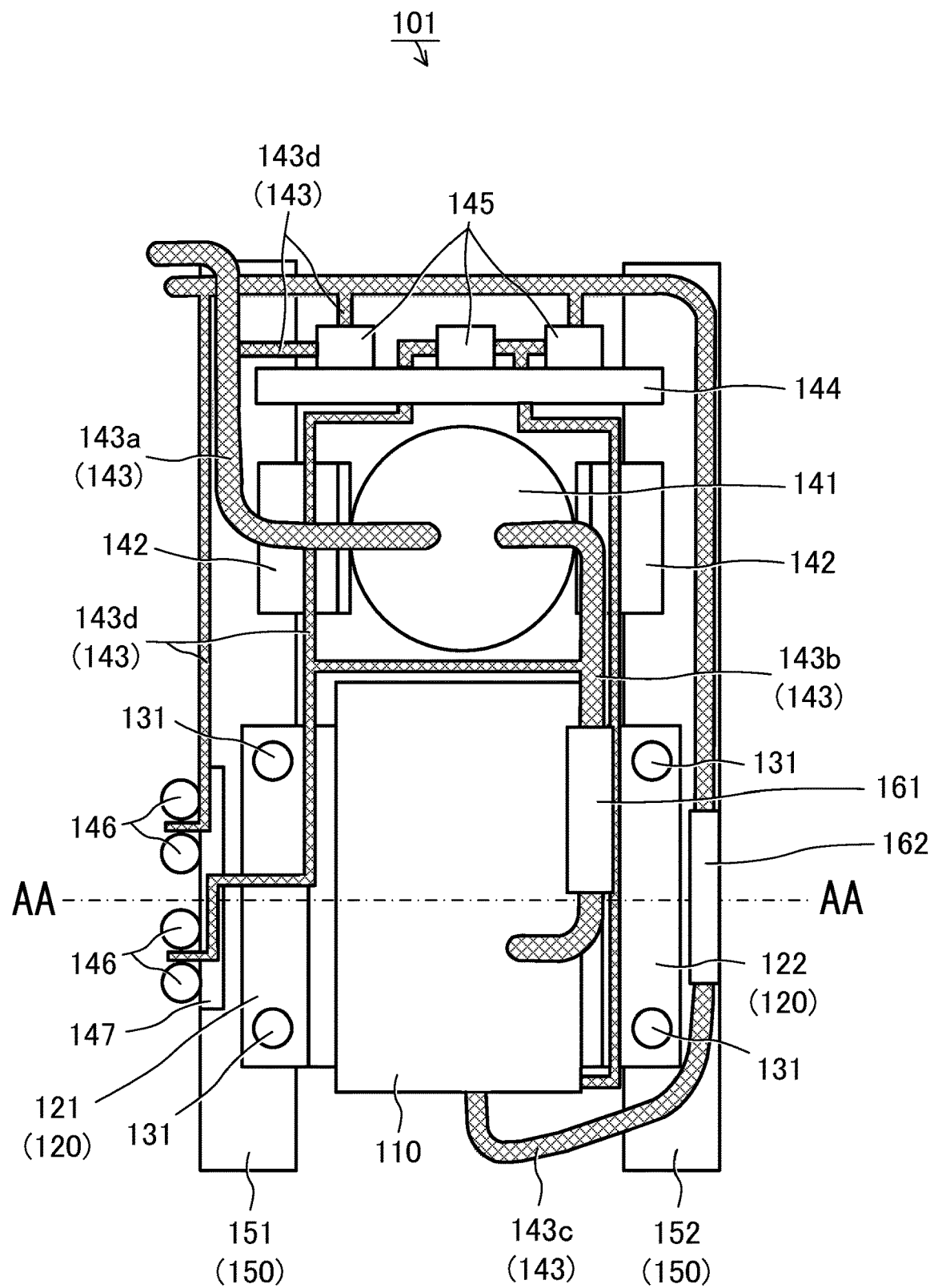
FIG. 4 is a plan view of a compressor module according to Embodiment 2.

As illustrated in FIG. 4, the compressor module 101 according to the present embodiment includes a flexible portion 161 provided on the intermediate main pipe 143b connecting the accumulator 141 and the compressor 110 together, and a flexible portion 162 provided on the outlet main pipe 143c connected to the compressor 110. The flexible portion 161 constructs a portion on the intermediate main pipe 143b facing the compressor 110. The flexible portion 162 constructs a portion on the outlet main pipe 143c facing the compressor 110.

The flexible portions 161 and 162 individually include a protective pipe containing a silicone-type internal pipe and a mesh structure covering the outer circumference of the internal pipe, and thus exhibit flexibility.

Examples of usable material having flexibility include not only silicone but also rubber, plastic, and other synthetic resins. Also, a bellows structure can also exhibit flexibility. For example, the flexible portions 161 and 162 can be configured to contain a bellows pipe as the internal pipe and a mesh-type protective pipe that covers the circumference of the bellows pipe.

According to the present embodiment, the vibration generated by the compressor 110 can be absorbed by the flexible portions 161 and 162. Thus, propagation to the refrigerant piping group 143 of vibrations generated by the compressor 110 can be suppressed. As a result, the vibrations that travel from the compressor module 101 to the casing 1 (see FIG. 6) or from the vehicular air-conditioning device 10 (see FIG. 6) to a vehicle can be reduced.

Also, since vibration of the refrigerant piping group 143 can be suppressed; the lifetime of the refrigerant piping group 143 can be extended. Also, since the stress acting on portions connecting the refrigerant piping group 143 with, for example, the compressor 110, the accumulator 141, and the pipe supporting member 144 can be lessened, extension of the lifetime of the connected portions and the entirety of the compressor module 101 can be expected.

There is no particular limitation on the arrangement positions of the flexible portions 161 and 162.

Embodiment 3

In previously-described Embodiment 1, the ancillary equipment 140 includes the accumulator 141 as the functional ancillary member that, together with the compressor 110, achieves the function of the refrigeration cycle device, but the accumulator 141 is not a necessary component as the functional ancillary members of the ancillary equipment 140. Below, a specific example is described with reference to FIG. 5.

Figure 5:
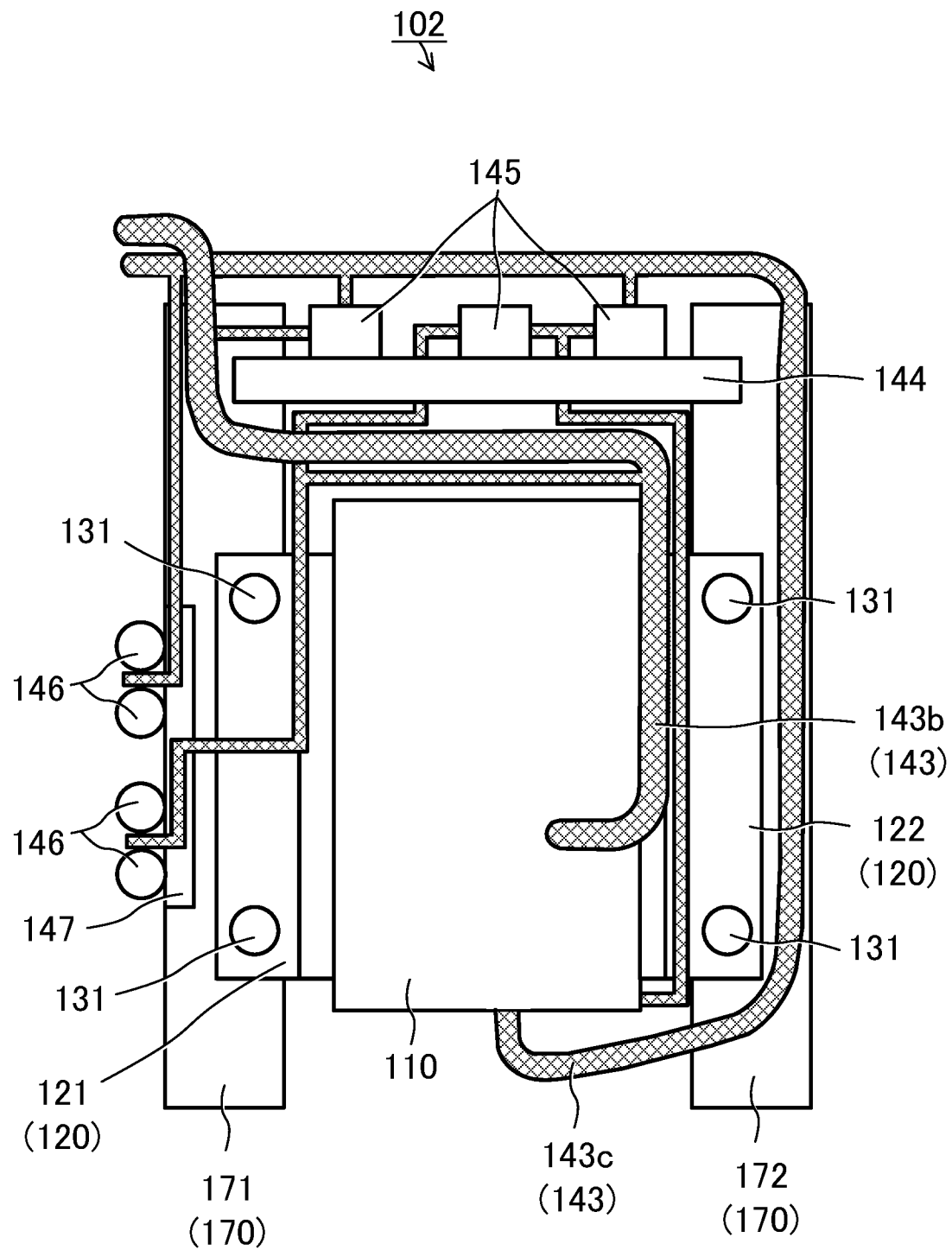
FIG. 5 is a plan view of a compressor module according to Embodiment 3.

As illustrated in FIG. 5, a compressor module 102 of the present embodiment does not include the accumulator 141 (see FIG. 2) as a component of the refrigeration cycle device. Thus, a base 170 is more compact. More specifically, the longitudinal size of a first rail 171 and a second rail 172 are shortened.

The accumulator 141 (see FIG. 2) may be installed inside the casing 1 separately from the compressor module 102. Alternatively, the refrigeration cycle device can be configured without the use of an accumulator 141, and in such a case, the casing 1 can be made even more compact.

Embodiments of the present disclosure are described above. However, the present disclosure is not restricted to those embodiments. Below are examples of acceptable modifications.

In the above embodiments, although the horizontal member 121a and the inclined portion 121b constitute the first supporting strip 121 and the horizontal member 122a and the inclined portion 122b constitute the second supporting strip 122, there is no particular limitation on the shape of the first supporting strip 121 and the second supporting strip 122 as long the first supporting strip 121 and the second supporting strip 122 are capable of supporting the compressor 110. In the above embodiments, although the vibration-reducing rubber body 130 is used as an elastic body, a spring may be used instead. Also, a dashpot may be used in combination with an elastic body.

In the above embodiments, the casing of the vehicular air-conditioning device is configured so as to be installable on the roof of a railway vehicle, the vehicular air-conditioning device may also be arranged under the floor of the railway vehicle.

In the above embodiments, the compressor module is used in the vehicular air-conditioning device but the compressor module itself may also be used as a component in a refrigeration cycle device in, for example, a freezer, a refrigerator, a vending machine, or a hot water heating apparatus.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese patent Application No. 2015-229699, filed on Nov. 25, 2015, the entire disclosure of which is incorporated by reference herein.

INDUSTRIAL APPLICABILITY

The compressor module of the present disclosure can be widely used as a component in a refrigeration cycle device. The vehicular air-conditioning device of the present disclosure is particularly well-suited for air-conditioning the passenger cabin of a railway vehicle.

REFERENCE SIGNS LIST

1 Casing
1a Bottom panel
1b First beam
1c Second beam
2 Air-conditioning apparatus
3 Module group (refrigeration cycle device)
4 Outdoor fan
5 Indoor fan
10 Vehicular air-conditioning device 100, 101, 102 Compressor module
110 Compressor
120 Supporting member
121 First supporting strip
122 Second supporting strip
121a, 122a Horizontal member
121b, 122b Inclined portion
130 Vibration-reducing rubber body (shock-absorbing body)
131 Auxiliary vibration-reducing rubber body
140 Ancillary equipment
141 Accumulator
142 Fixing member
143 Refrigerant piping group
143a Inlet main pipe
143b Intermediate main pipe
143c Outlet main pipe
143d Support piping group
144 Pipe supporting member
145 Valve
146 Sensor
147 Sensor supporting member
150, 170 Base
151, 171 First rail
152, 172 Second rail
161, 162 Flexible portion
200 Outdoor heat-exchanger module (cooperating device)
201 Outdoor heat-exchanger (condenser)
300 Indoor heat-exchanger module (cooperating device)
301 Indoor heat-exchanger (evaporator)

The invention claimed is:

1. A compressor module for attaching to a casing that houses a refrigeration cycle device, the compressor module being a constituent component of the refrigeration cycle device, the compressor module comprising:
    a compressor to compress refrigerant;
    a supporting member to support the compressor;
    at least one shock-absorbing body attached to the supporting member;
    ancillary equipment added to the compressor; and
    a base fixed to the casing and including a first portion to support the supporting member via the shock-absorbing body, and to support the ancillary equipment with a second portion of the base other than the first portion supporting the supporting member, wherein the base includes a pair of rails extending parallel to each other with a gap therebetween.

2. The compressor module according to claim 1, wherein the supporting member includes a pair of inclined portions, each inclined portion supported by only a respective rail of the pair of rails via a respective shock-absorbing body of the at least one shock-absorbing body, each of the inclined portions inclining downward from one rail of the pair of rails toward the other rail of the pair of rails, and
    the pair of inclined portions supports the compressor.

3. The compressor module according to claim 2, wherein a bottom end of the compressor is situated in a position lower than a surface of the at least one shock-absorbing body that is attached to the supporting member.

4. The compressor module according to claim 3, wherein a center of gravity of the compressor is equal to or lower than a height of the surface of the at least one shock-absorbing body that is attached to the supporting member.

5. The compressor module according to claim 1, wherein the ancillary equipment includes a refrigerant pipe that is connected to the compressor and circulates refrigerant, and
    the refrigerant pipe includes a flexible portion that is flexible.

6. A vehicular air-conditioning device comprising:
    the compressor module according to claim 1;
    the casing installed on a vehicle, the casing housing the compressor module; and
    cooperating devices fixed to the casing, the cooperating devices including a condenser, an expander, and an evaporator that together with the compressor module constitute the refrigeration cycle device.

7. A compressor module manufacturing method, the method comprising:
    a step of joining to a compressor that compresses refrigerant, a supporting member for supporting the compressor; and
    a step of disposing the supporting member, via a shock-absorbing body, onto a base including a pair of rails extending parallel to each other with a gap therebetween, the base fixed to a casing that houses the compressor, thereby causing the base to support the first portion of a compressor, and attaching ancillary equipment, added to the compressor, to a second portion of the base other than the first portion supporting the supporting member.

* * * * *